United States Patent Office
3,717,542
Patented Feb. 20, 1973

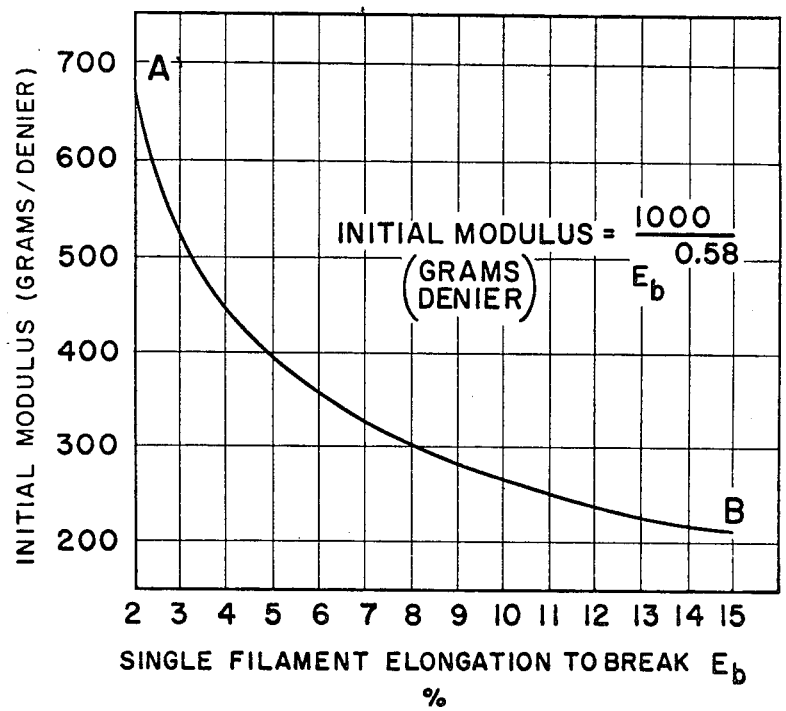

3,717,542
FLEXIBLE RUBBER ARTICLES REINFORCED WITH FIBER OF CERTAIN POLYAMIDE-HYDRAZIDE POLYMERS
Brian K. Daniels and Jack Preston, Raleigh, N.C., and David A. Zaukelies, Pensacola, Fla., assignors to Monsanto Company, St. Louis, Mo.
Continuation-in-part of application Ser. No. 748,559, July 29, 1968, now Patent No. 3,600,269. This application June 30, 1971, Ser. No. 158,182
The portion of the term of the patent subsequent to Aug. 17, 1988, has been disclaimed
Int. Cl. B32b 25/02, 27/34
U.S. Cl. 161—170   11 Claims

ABSTRACT OF THE DISCLOSURE

Flexible rubber articles reinforced with high temperature organic fibers having densities greater than 1.37 g./ml. and unusually high initial moduli of over 700 grams per denier at elongations of 2% or greater are disclosed. The reinforcing fiber elements are made from wholly aromatic polymers having melting points above 200° C. and inherent viscosities of at least 3.5. The polymers are further characterized in that the recurring divalent aromatic radicals along the polymer chain are at least about 85 weight percent para-oriented, have a plane of symmetry or are linked by ring atoms representing the maximum spacing. The fibers are particularly useful as reinforcing elements in V-belts, conveyor belts and pneumatic rubber tires, and especially in the belt plies of belted tires.

This application is a continuation-in-part of application Ser. No. 748,559, filed July 29, 1968, now U.S. Pat. No. 3,600,269.

BACKGROUND OF THE INVENTION

It is known to reinforce flexible rubber articles, such as pneumatic tires, with cords or strands of organic or inorganic material. Cotton, rayon, nylon and polyester have been used as basic tire cords in tire carcasses, while primarily fiber glass and steel wire have been used in tire belts. Recently, there has been a widespread and growing interest in belted tires in the United States. As a result, there is a need to develop an organic fiber that is competitive with fiber glass and steel wire for the reinforcement of tire belts. Organic fibers offer certain advantages over steel wire, for example, they are lighter weight and are easier to process and handle. In general a belt cord must have the following properties: high dynamic modulus, high stiffness, high strength, low growth and creep (dimensional stability), high compression modulus and at least minimal fatigue requirements.

A specific object of the present invention is to provide a tire belt reinforced with an organic fiber having a high tenacity, low elongation and a high modulus.

Another object of the invention is to provide other rubber articles, such as, V-belts, conveyor belts, rubber hoses and the like, reinforced with an organic fiber having a high tenacity, low elongation and a high modulus.

SUMMARY OF THE INVENTION

The present invention provides rubber articles reinforced with fiber of an organic polymer, wherein the fiber has a specific density of at least 1.37, single filament elongation-to-break ($E_b$) ranging from 2.0 to 15 percent and an initial modulus in grams per denier greater than the value, $1000 \ (E_b^{-0.58})$, and wherein said polymer has a melting point above 200° C. and a structure represented by the following formula

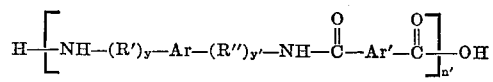

wherein Ar and Ar' represent aromatic carbocyclic residues, aromatic heterocyclic residues and combinations thereof which must be at least about 85 weight percent para-oriented, have a plane of symmetry or are linked by ring atoms representing the maximum spacing, any extracyclic bonding within said aromatic residues being through a radical selected from the group consisting of

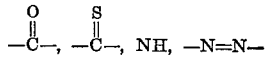

and combinations thereof, R' and R" are radicals selected from the group consisting of

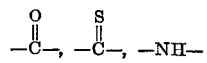

and combinations thereof, $y$ and $y'$ are the values 0 or 1 and $n'$ is a number large enough to provide a polymer having an inherent viscosity of at least 3.5.

Particularly preferred fibers for use in the invention are those composed of a polymer having recurring units of the structure

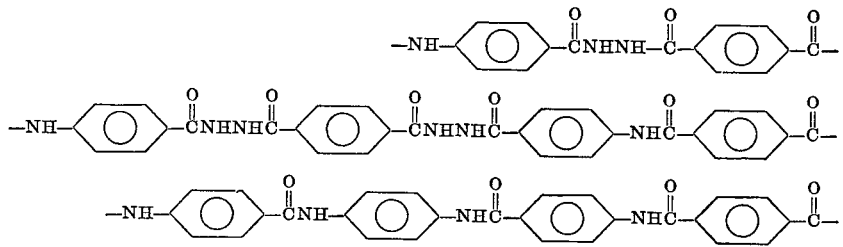

DETAILED DESCRIPTION OF THE INVENTION

The value, $1000 \ (E_b^{-0.58})$, wherein the single filament elongation-to-break ($E_b$) lies between 2.0 and 15 percent constitutes the slope of the curve AB on the graph in the figure. Thus, the family of fibers employed in the instant invention must possess initial moduli of greater than about 210 at 15 percent elongation-to-break and an initial moduli of greater than about 700 at 2 percent elongation. These extraordinary properties are unique for high temperature, high density organic fibers and provide a versatility of property relationships within the above-indicated limits which have not heretofore been approached by modern science.

The class of polymers capable of being spun into the high modulus fibers used in this invention are wholly aromatic linear polymers which provide rigid chains such that the ability for the polymer chain to fold, rotate in random coil or irregular fashion is minimized. That is, it is essential that there must be little irregular molecular spin along the chain so that the oriented molecules in the fiber form are capable of packing to the extent that fiber densities of 1.37 or greater can be achieved. Efficient or close molecular packing, reflected by the fiber density is essential to the achievement of the greatly superior and unique combination of properties possessed by the fibers of this invention. To insure rigidity along the polymer chain, the recurring divalent aromatic radical along the polymer chain must have centers of symmetry, as in the case of 1,5-naphthylene, 2,6-naphthylene, and 4,4'-biphenylene, or simply be all para oriented, or they may be a combination of para oriented aromatic radicals along with other aromatic radicals having centers of symmetry. Another essential feature of this class of polymers is that the recurring aromatic radicals along the polymer chain must be linked in the chain through carbocyclic carbon atoms to one of

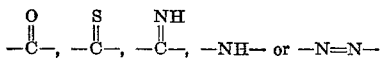

radicals. These interlinking groups and combinations of them, such as

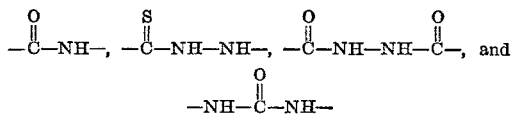

to the exclusion of those radicals which allow the polymer chains to fold, bend or otherwise penetrate the circumference of the theoretical cylinder formed by the orbital molecular rotation of molecules in a rigid chain polymer, are essential to the achievement of superior fiber properties. We have also found that the above-described aromatic radicals may be linked in the polymer chain, without disruption of chain rigidity, by single or multiple ring aromatic heterocyclic radicals which do not allow the chain to bend or fold as reflected by fibers prepared therefrom having densities greater than 1.37.

The aromatic heterocyclic radicals which may be present in the wholly aromatic polymers are unsubstituted 5 and 6 membered rings containing only the C, O, S and N. In order to maintain the chain rigidity necessary for this invention the heterocyclic radicals must contain at least two extracyclic interlinear covalent bonds which are non-adjacent with respect to the cyclic atoms of the ring. Additionally, at least two extracyclic interlinear covalent bonds must be oriented with respect to one another at maximum spacing. These requirements apply with respect to the single rings in the case of a multi-ring system. Exemplary of such ring systems are the following radicals:

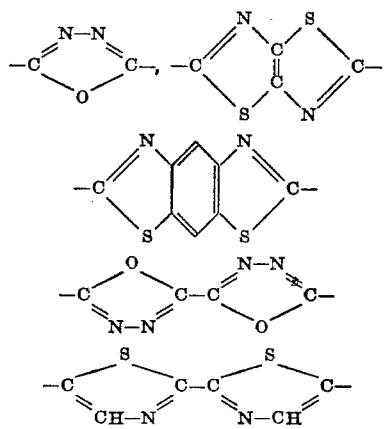

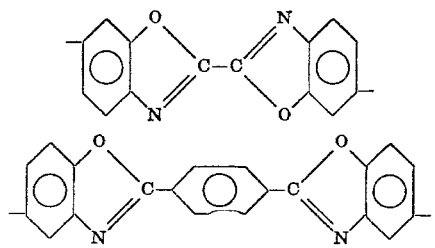

Thus, the key to the orientation of the carbocyclic or heterocyclic radicals which may form links in the polymer chains is that the covalent bond at one end of a given radical must be that which is the greatest distance possible from the other bond or bonds linking the radical in the polymer chains.

In addition to the chemical requirements for the polymers above-mentioned there are two other physical properties of the polymer which must be observed before fibers spun from the polymers can achieve the remarkable properties of the fibers disclosed. The polymer must not melt at temperatures below about 200° C. which provides good fiber properties in many use application without which other fibers having similar properties would not be useful.

In this respect polymers employed in the fiber reinforcing elements of this invention exhibit only slight changes in dynamic mechanical modulus (less than about 20 percent in Vibron determinations run at 11 cycles/second) in the range from 25° C. to 200° C. indicating excellent retention of properties over a wide temperature range. This characteristic differs greatly from that found in many other polymers and permits use of the fibers of the invention as composite reinforcements with a variety of fabrication techniques in which other organic reinforcing fibers wuold be degraded to the extent that their utility as reinforcing materials would be essentially negated.

Moreover, the polymers used to make the fibers used in this invention must have molecular weights high enough to reflect inherent viscosities of at least 3.5. It has been generally observed that polymers of the class mentioned above, even though corresponding to other essential requirements, do not provide fibers having the properties of the fibers used in this invention unless the inherent viscosities are greater than 3.5.

Even though the viscosities of the polymers necessarily employed in this invention are unusually high for formation of fibers, the average molecular weights of the rigid-chain polymers necessary to achieve such viscosities are quite low when compared to molecular weights of fiber forming polymers of the well-known acrylic, polyolefin and alphatic polyamide types. Thus, the number average molecular weights of the high viscosity polymers used in this invention may lie in the range of 50,000 to 100,000, for example, whereas fiber-forming polyolefins characteristically possess molecular weights of much higher order.

As long as the linearity, the rigidity, the viscosity, the stability to heat up to 200° C. and chemical nature of the polymers are observed in accordance with the limitations described, the method of polymer preparation has not been found to be critical. Accordingly, the polymers may be prepared by any convenient means. Perhaps the most convenient means comprises solution polymerization of appropriate aromatic diisocyanates or diacide halides with essentially equimolar quantities of difunctional wholly aromatic monomers containing terminal —$NH_2$ radicals.

These reactions may conveniently be illustrated as follows:

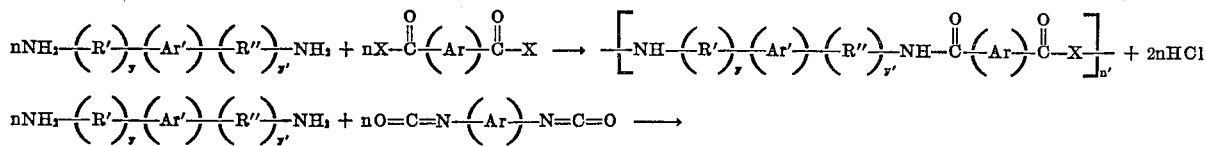

wherein Ar and Ar' may be the same or different wholly aromatic, single or multiple ring, carbocyclic or heterocyclic residues and combinations thereof, R' and R'' may be the same or different divalent groups,

—NH— and combinations thereof, y and y' represent the same or different values 0 and 1, X is a halogen, preferably chlorine, n is a positive number and n' is a number representative of the number of repeat units in the polymer necessary to reflect an inherent viscosity of at least 3.5. Sulfur may be used in the monomers where oxygen is indicated.

A representative polymer system which may be employed to illustrate the polymer, its preparation and spin-

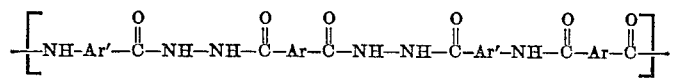

ning to form the novel and superior organic fibers used in this invention is an essentially linear wholly aromatic polyamide-hydrazide polymer which contains the alternating units characterized by the following formulas:

 (I)

and

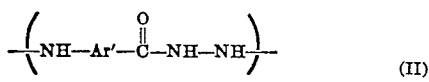 (II)

wherein Ar and Ar' represent the same or different divalent aromatic residues which must be a para oriented single ring, or a multiple or fused ring system containing a center of symmetry with respect to the extracyclic covalent bonding sites, or in the case of aromatic heterocyclic rings the extracyclic bonding must be such that the interlinear spacing is at a maximum distance. Such radicals, in addition to those already mentioned, include the following:

wherein R may be radicals such as

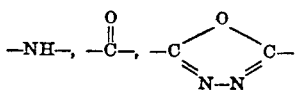

and others hereinabove described, and combinations thereof.

Thus, the wholly aromatic polyamide hydrazide may be represented by repeating segments having the formula:

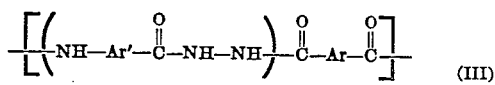 (III)

wherein Ar and Ar' are above defined. The parentheses in Formula III connote the fact that the alternating units, I and II, may occur in head-to-head or head-to-tail fashion to the extent that the arrangement of repeating or alternating units may be such that the polymers range from wholly ordered polymers to polymers having no discernible order as is hereinafter described in greater detail.

In general the wholly aromatic polyamide hydrazides above-described may be prepared through polymerization reactions involving one or two steps. In the case of a two-step reaction, the first step involves the preparation of an amine terminated aromatic dihydrazide, represented by IV. The second step involves reaction of IV:

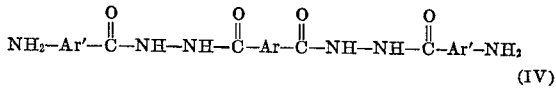 (IV)

with equimolar quantities of aromatic diacid halide. The product of a two-step reaction is an essentialy wholly ordered polymer of regularly recurring segments which segments are represented by the following formula:

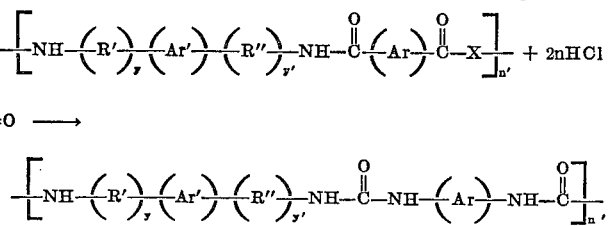

 (V)

The term, essentially wholly ordered, as employed herein is intended to connote the orderly arrangement of molecules precisely as set forth in the repeating segment of Formula V and is intended to include those specific compositions which are characterized by such arrangement of molecules, even though an occassional Ar or Ar' group may be derived through the use of a mixture of essentially functionally equivalent monomers.

The one-step preparation of the wholly aromatic polyamidehydrazide may be achieved through the reaction of essentially equimolar quantities of an aromatic diacid halide and an aromatic amino-hydrazide as depicted using p-aminobenzhydrazide and terephthaloyl chloride in the following reaction scheme:

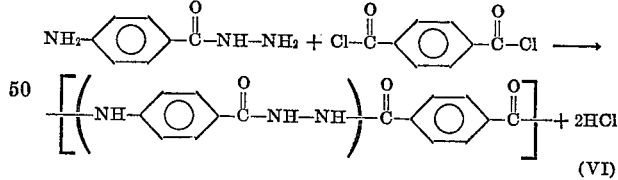

(VI)

Insofar as chemically unsymmetrical monomers such as p-aminobenzhydrazide can enter the polymer in either head-to-head or head-to-tail fashion, as mentioned earlier, no single repeat segment (represented by Formula V) is assured as in the case of the above-described two-stage reaction. Therefore, when referring to the arrangement of units of Formula II the parentheses employed, as in Formulas II and III and reaction VI indicate that such units may occur in reverse order with respect to any such unit along the polymer chain. Thus, the polymers used to prepare the fibers employed in this invention may comprise one or more units having the formulas:

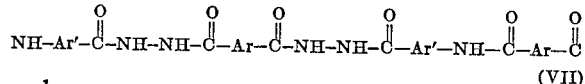

(VII)

and

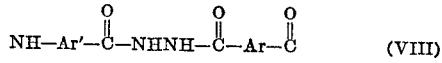 (VIII)

or

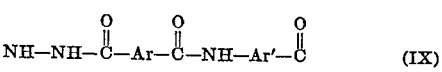 (IX)

used in the sense of being polymer chain segments and not necessarily repeating segments or units so that as either $x$ or $y$ approaches 0 in Formula X:

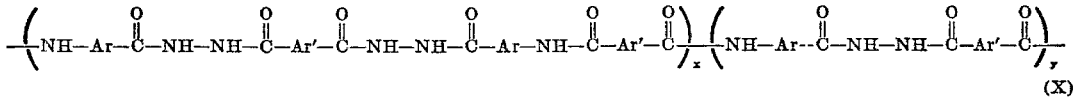

the polymer becomes a more ordered polymer ($x$ and $y$ are average numbers, including zero [the sum of $x$ and $y$] being representative of the average sequence lengths of segments VII and VIII, respectively). As a general rule, it has been found that those reaction conditions which increase the degree to which the reaction is kinetically controlled will result in an increase in the order of the polymer produced, whereas, those conditions which increase the degree to which the reaction is diffusion controlled will result in decrease in the order of the polymer produced.

The above-described polyamide hydrazide polymers may be prepared through the use of known solution and interfacial techniques. However, since neither the intermediate dihydrazide diamine of Formula IV nor the final polymer of either the one-step or two-step preparation need be isolated prior to polymerization or prior to the formation of fibers according to this invention, the solution polymerization technique is highly preferred.

Solution polymerization generally involves the dissolution of the dihydrazide diamine of Formula IV or the aromatic amino-hydrazide monomers in a suitable solvent which solvent is also a solvent for the aromatic diacid halide and the product polymer. Typical of such solvents are N,N-dimethylacetamide, N-methyl - 2 - pyrrolidone, hexamethylphosphoramide and mixtures of these and like solvents. In many instances, such solvents are rendered more effective by mixing them with small quantities, generally not more than about ten percent by weight, of a salt of an alkali or alkaline earth metal, such as lithium chloride, calcium chloride, magnesium bromide and the like. Preferred among such solvents for the polymerization is N,N-dimethylacetamide (DMAc), and especially DMAc containing a small amount of dissolved lithium chloride. To the solution of the dihydrazide diamine or aromatic amino-hydrazide reactant maintained at a temperature between —30° C. and 100° C., preferably between —20° C. and 35° C., the aromatic diacid halide is added as a solid, a liquid or as a solution. The reaction mixture should be stirred during addition of the aromatic diacid halide and until the reaction is substantially complete or until the desired viscosity is obtained. Hydrogen halide by-product should be neutralized upon completion of the polymerization reaction in order to reduce its corrosive effects or extrusion or other handling equipment. This may be accomplished by adding essentially stoichiometric quantities of materials such as lithium hydroxide, lithium carbonate, calcium carbonate, calcium acetate and the like.

Superior fiber reinforcing elements of this invention have been prepared employing wet spinning or a dry-jet wet spinning technique, the latter technique being where the solution of polymer is extruded from one or more orifices situated a short distance above the surface of a coagulation bath, into a gaseous atmosphere and then into the coagulation bath principaly composed of water and a minor proportion of the solvent or solvents employed in the spinning solution to thereby coagulate the freshly extruded filament in gel form. The gel filament, resulting from either wet spinning or dry-jet wet spinning is thereafter washed to extract salts and solvent, wet-stretched, dried, optionally given a conventional textile antistatic and/or lubricant finish, optionally heat-stretched and packaged. Spinnability of the aromatic polymers is excellent so long as the dopes remain gel-free. Where there is a tendency toward gross gellation or to form gelled particles in the dopes, particularly in dopes of high viscosities, the addition of small amounts of water serves to improve dope stability. Spinnability of the high viscosity dopes required by the invention can be improved by mild heating to reduce viscosity. The polymer dopes are preferably, but not critically, held at temperatures between about 40° C. and 120° C., preferably from 60° C. and 90° C., and at polymer concentrations of from about 4 to 12 percent by weight of solids, both parameters depending primarily on the average molecular weight of the polymer as reflected by its inherent viscosity. Moreover, in dry-jet wet spinning operations the optimum distance of the jet face from the surface of the coagulation bath generally lies within the range of from about one-eighth to about one-half of an inch depending on viscosity, temperature and other conditions.

The versatility of fibers of the class of wholly aromatic polymers described herein can be realized principally through variation of polymer chemical orientation, viscosity and spinning conditions. To achieve maximum tensile properties, polymers having high or complete para orientation should be employed at rather high polymer viscosities and spun under conditions which minimize the spin orientation by minimizing the stretch during the coagulation and in a hot water cascade and thereafter thermally stretching the fiber under generally non-aqueous conditions to impart maximum stretch orientation and crystallinity.

More particularly, where fibers having modulus values exceeding those of the best glass fibers are desired, the polymers described in Formula III should be highly para oriented, thus the divalent residue Ar should be greater than 85 weight percent para oriented and Ar' should be at greater than 85 weight percent para oriented with any different orientation of the Ar' residue being essentially meta orientation. Quasi-para orientation occurs in the case of heterocyclic rings such as,

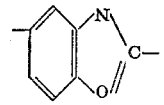

where the orientation represents considerably greater maximum spacing than meta orientation and slightly less than para orientation at maximum possible distance for the particular radical. Therefore, in the consideration of chain rigidity of the polymers employed in the instant invention it will be observed that radicals possessing quasi-para orientation can occur considerably more frequently along the polymer chain than in the case of meta-oriented radicals without sacrifice of chain rigidity.

It has been found that the X-ray diffractions of high modulus fibers of polymers made from terephthaloyl chloride and p-aminobenzhydrazide are "collagen-like" with respect to the numerous orders of reflection in the longitudinal direction, indicating a high degree of regularity over long distances in the polymer chain. This is interpreted to mean that the polymer is not chainfolded but in the extended configuration. Such an interpretation is also consistent with electron diffraction data obtained on these polymers and their almost total lack of any low angle X-ray scattering. The high moduli of the fibers of the instant invention differ from fibers made from polymers which contain tetrahedral carbon atoms, meta-phenylenes, cyclohexane and similar ring structures, all of which contain chainfolding or a "zig-zag" array of chain units. Insofar as the fibers of this invention are in the fully extended state or nearly so, stress is to a large extent against the para-phenylene rings which can yield little under stress thus:

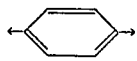

While the polymers useful in making the fibers used in this invention have been illustrated in great detail with respect to a given system for purposes of being concise, other polymers, for further example, represented by the formulas:

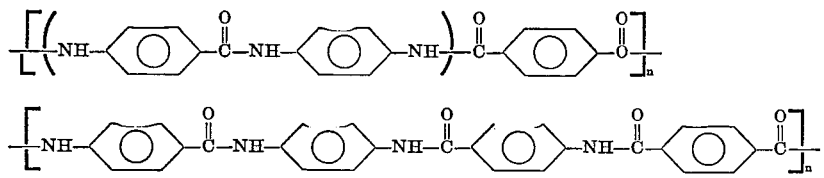

prepared by polycondensation of terephthaloyl halide with appropriate amines, can also be used to make the fibers described herein by spinning processes which result in high stretch orientation to result in fibers having densities greater than 1.37 as earlier indicated.

Inherent viscosities of fiber described herein can be determined in any suitable polymer solvent such as N-methylpyrrolidone, dimethylacetamide, dimethylacetamide with lithium chloride, concentrated sulfuric acid, dimethylsulfoxide, hexamethylphosphoramide and the like generally as 0.5 percent solution of polymer at about 30° C. Similarly, viscosities can be determined at other concentrations where convenient, for example, 0.1 percent solutions can be employed.

Fiber densities as herein described are readily obtained by placing a fiber sample in a liquid having a density lower than that of the fiber sample and raising the density of the liquid by addition of another liquid having a density greater than that of the fiber sample until a liquid/fiber density equilibrium is achieved after which the density of the equilibrium density liquid can be accurately measured on a Fisher-Davidson Gravitometer. The term "density" used herein is intended to be synonomous with specific gravity.

Birefringence values reported herein were obtained using an Ehringhaus High Order Compensator.

The present invention is further illustrated by the following examples which are not intended to be limiting in any respect. In the examples, the fiber, tenacity, elongation and modulus values were obtained using an Instron Tester (Model No. TM) with a 1-inch gauge length and an extension rate of 100 percent per minute. The fiber samples were preconditioned at 65 percent relative humidity at 70° F. for 24 hours prior to testing, and then tested at these conditions. The data presented are generally the result of 5 breaks.

In the following examples, the preparation of all polymers was carried out under nitrogen. The polymer solutions were spun into a water bath at 20° C., containing 0–2 percent dimethylacetamide, unless stated otherwise. Spinning speeds were generally about 100' per minute. Hot-drawing was carried out over a 12" hot block with profile temperature.

The organic fibers described herein may be used in a conventional manner to provide reinforced flexible rubber articles.

EXAMPLE I

A clean, dry 30-gallon Pfaudler reactor equipped with stirrer, gas inlet tube and drying tube was purged with nitrogen and charged with 139 lbs. (66.725 liters) of dry DMAc. A 0.24% excess of para-aminobenzhydrizide (PABH), 2727.8 grams, was then added to the reactor and dissolved in the DMAc. The reactor temperature was adjusted to between −10 and −15° C. at which temperature 3654.5 grams of solid terephthaloyl chloride (TCl) was added to the solution with rapid stirring. Upon completion of addition of TCl the stirrer speed was increased for about 5 minutes. Thereafter, the stirrer speed gradually reduced as the viscosity of the dope (polymer solution) increased. External cooling of the reactor was discontinued 30 minutes after completion of the TCl addition. After 1.5 hours, a slurry of 3171.2 grams calcium acetate, 653.4 grams deionized water and 24.2 lbs. of DMAc was added to the polymerization mixture reached 15–20° C., the reaction mixture was gradually heated with continued stirring until the reaction mixture reached a temperature of 50° C. The reaction mixture was then degassed by vacuum for one hour. A polymer solution containing 6.7 solids was obtained having a Brookfield viscosity at 25° C. of 9,250 poises and an inherent viscosity of 6.49 (0.1 gram in 100 ml. of dimethylsulfoxide [DMSO] at 30° C.).

The dope, thus prepared, was pumped at a rate of 40.5 cc./min. into an aqueous coagulation bath maintained at 20° C. from a 7 mil., 90-hole spinnerette situated a small distance above the surface of the bath with a calculated jet-stretch of 1.0×, washed in an aqueous cascade bath with a calculated cascade stretch of 1.33×, dried first at 100° C. and then at 150° C. on rolls and then subjected to a two stage hot stretch of 1.25× and 1.10× at temperatures of 300° C. and 350° C., respectively. The fiber thereafter was collected on a bobbin. The processed fiber had the following properties:

| | |
|---|---|
| Denier _____ d.p.f__ | 6.13 |
| Tenacity _____ g.p.d__ | 14.96 |
| Single filament elongation-to-break _____ percent__ | 3.0 |
| Initial modulus _____ g.p.d__ | 731 |
| Worktobreak (g./cm./den./cm.) _____ | 0.32 |

EXAMPLE II

A polyamide-hydrazide polymer solution was prepared and spun into fiber according to the procedure described in Example I. Tire cord was made from the fiber, the cord construction being 1050/3 cord 6 x 4.5 twist, where the 6 and 4.5 are twists in opposite direction. The cord had the following properties:

| | |
|---|---|
| Denier _____ | *3332 |
| Tenacity _____ g.p.d__ | 7.12 |
| Elongation _____ percent__ | 10.9 |
| Growth _____ do____ | 0.6 |

*Strength=approx. 5 lbs.

EXAMPLE III

The following G-78 x 14 tubeless tires of belted bias construction were built using the following indicated cord in the plies:

| Body plies | Belt plies (18 ends per inch) | Tire No. |
|---|---|---|
| 2, Nylon 66_____ | 2, Example II cord_____ | 1-2 |
| Do_____ | 2, glass_____ | 3-4 |
| 2, polyester_____ | 2, Example II cord_____ | 5-6 |
| Do_____ | 2, glass_____ | 7-8 |

The tires were mounted on automobiles and inflated to 24 p.s.i.g. and supported a 1380 lb. standard load. The automobiles were driven on a 9 mile circumference test track in Texas at 70 m.p.h. for 19,000 miles. Each of the tires were then examined for tire performance and tread wear. The results of the test are given in Tables 1 and 2.

TABLE 1.—TIRE PERFORMANCE

| Tire No. | Construction | Mileage | Failure |
|---|---|---|---|
| 1 | Nylon 66, Example II cord | 19,000 | None. |
| 2 | do | 19,000 | Do. |
| 3 | Nylon 66, glass | 19,000 | Do. |
| 4 | do | 19,000 | Do. |
| 5 | Polyester, Example II cord | 19,000 | Do. |
| 6 | do | 7,625 | Separation-belt edge. |
| 7 | Polyester, glass | 19,000 | None. |
| 8 | do | 400 | Separation off belt. |

TABLE 2.—TREAD LOSS (MILES/MIL) AT 19,000 MILES

| Tire No. | Construction | Inside shoulder | Center | Outside shoulder |
|---|---|---|---|---|
| 1 | Nylon 66, Example II cord | 53.7 | 73.4 | 54.8 |
| 2 | do | 58.3 | 79.8 | 59.6 |
| 3 | Nylon 66, glass | 54.8 | 86.0 | 55.9 |
| 5 | Polyester, Example II cord | Smooth | 64.0 | 48.0 |
| 6 | do | Smooth | 63.5 | 48.7 |
| 7 | Polyester, glass | 49.1 | 62.3 | 48.3 |

The data in the above tables show that rubber tires reinforced with the fiber of Example II provide good performance and tread wear.

EXAMPLE IV

This example illustrates another polyamide-hydrazide fiber which may be used to reinforce rubber articles.

4.32 g. (0.01 m.) of the diamine,

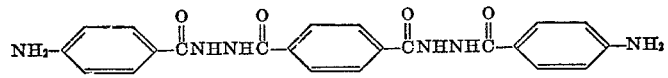

prepared from an excess of p-aminobenzhydrazide and terephthaloyl chloride, was dissolved in 70 ml. of DMAc containing 5 percent dissolved lithium chloride under nitrogen. The solution was cooled to −10° C. and 2.03 g. (0.01 m.) of terephthaloyl chloride was added. After 10 minutes, the clear viscous polymer solution which formed was warmed to room temperature, and an additional 20 ml. of DMAc with 5 percent dissolved LiCl was added. After stirring for 30 minutes at room temperature the dope was neutralized by the addition of 0.67 g. (90 percent of theory) $Li_2CO_3$ and 10 ml. DMAc. The 5 percent polymer dope was stirred at room temperature for 1 hour, at 50° C. for 30 min. and then at 80° C. for 20 min. The dope was then degassed under house vacuum for 10 minutes. The polymer had an inherent viscosity of 5.08 (0.5 percent in DMSO at 30° C.).

The polymer solution having a Brookfield viscosity of 24,000 poises was spun through a 5 mil., 10 hole jet, at a jet-stretch of 2.34, a cascade stretch of 1.14 and a dried temperature of 150° C. One sample of fiber (a) was hot-drawn 1.25× at 300° C., while a second sample (b) was not hot-drawn. Unaveraged single filament properties of these fiber samples are given in the following table.

| Sample | Denier (d.p.f.) | Tenacity (g.p.d.) | Elongation percent | Initial modulus (g.p.d.) | Density | Birefringence |
|---|---|---|---|---|---|---|
| (a) | 2.69 | 10.9 | 2.7 | 590 | 1.47 | 0.455 |
| (b) | 3.48 | 8.50 | 12.0 | 323 | 1.44 | 0.421 |

EXAMPLE V

A polyamide-hydrazide prepared in the manner described in Example I was dissolved in DMAc to provide a dope containing about 6 weight percent of polymer solids and having a Brookfield viscosity of 9,000 poises. The dope at 45° C. was pumped at a rate of 40.5 cc./min. through a spinnerette having an array of 90, 7 mil. diameter orifices into air for a short distance and into an aqueous coagulation bath containing a minor proportion of DMAc. The coagulated filaments were continuously passed from the coagulation bath into a water cascade at 65° C. and thereafter dried on a first godet at 100° C. and a second godet at 150° C. The dried filaments were then heat stretched by passing them over a first shoe at 300° C. and a second hot shoe at 350° C. and thereafter taken-up. The stretching involved in the spinning process consisted of a 1.0× jet stretch during coagulation, 1.4× cascade stretch, 1.3× stretch on the first hot shoe and a 1.04× stretch on the second hot shoe. The collected fiber was characterized and exhibited the following properties:

Denier—6.26
Tenacity—14.3 grams/denier
Elongation (%)—3.7
Modulus—594 grams/denier
Work-to-break (g./cm./den./cm.)—.33

The following results indicate the wide variety of properties obtainable from a given polymer solution, as a result of minor variations in the spinning conditions used.

| Sample | Tenacity (g.p.d.) | Elongation (percent) | Modulus (g.p.d.) | Work to break (g./cm./d./cm.) |
|---|---|---|---|---|
| 1 | 7.9 | 8.8 | 242 | 0.572 |
| 2 | 4.8 | 40.9 | 104 | 1.944 |
| 3 | 6.3 | 15.5 | 208 | 0.864 |
| 4 | 12.2 | 3.7 | 440 | 0.330 |
| 5 | 15.0 | 3.5 | 570 | |

The polyamide-hydride fibers described herein may be used in a conventional manner to reinforce flexible rubber articles.

What is claimed is:

1. A flexible rubber article reinforced with fiber of an organic polymer wherein said fiber has a specific density of at least 1.37, single filament elongation-to-break ($E_b$) ranging from 2.0 to 15 percent and an initial modulus in grams per denier greater than the value, $1000 (E_b^{-0.58})$, and wherein said polymer has a melting point above 200° C. and a structure represented by the following formula

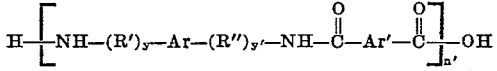

wherein Ar and Ar' represent aromatic carbocyclic residues, aromatic heterocyclic residues and combinations thereof which must be at least about 85 percent para-oriented, have a plane of symmetry or be linked by ring atoms representing the maximum spacing, any extracyclic bonding within said aromatic residues being through a radical selected from the group consisting of

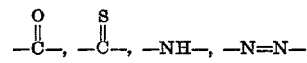

and combinations thereof, R' and R" are radicals selected from the group consisting of

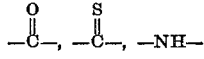

and combinations thereof, y and y' are the values 0 or 1 and n' is a number large enough to provide a polymer having an inherent viscosity of at least 3.5.

2. The article of claim 1 wherein the fiber is embedded in the rubber as a continuous filament.

3. The article of claim 1 wherein the fiber is embedded in the rubber in the form of a fabric.

4. The article of claim 1 wherein Ar and Ar' are phenylene radicals.

5. The article of claim 4 wherein Ar and Ar' are paraphenylene radicals.

6. The article of claim 1 wherein R" is

and $y'=1$.

7. The article of claim 1 wherein said fiber is composed of a polymer consisting essentially of recurring para-oriented phenylene rings interlinked through 1 or more of the groups

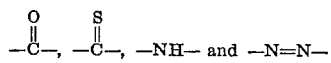, —NH— and —N=N— and combinations thereof.

8. The article of claim 7 wherein the fiber is composed of a polymer represented by the following formula:

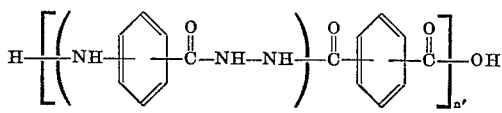

wherein $n'$ is a number representative of the number of repeat units repuired to achieve an inherent viscosity of greater than 3.5.

9. The article of claim 8 wherein the fiber is a wholly para-oriented polymer.

10. The article of claim 7 wherein the fiber is composed of polymer represented by the formula

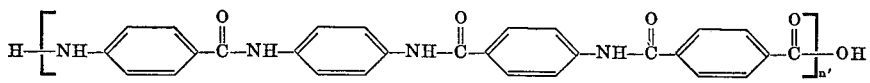

wherein $n'$ is a number representative of the number of repeat units necessary to achieve the inherent viscosity of greater than 3.5.

11. The article of claim 7 wherein the fiber is composed of the polymer represented by the formula:

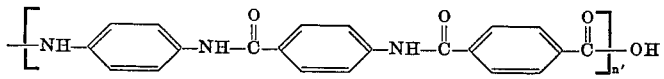

wherein $n'$ is the number representative for the number of repeat units required to achieve the inherent viscosity of greater than 3.5.

References Cited
UNITED STATES PATENTS

| | | | |
|---|---|---|---|
| 3,600,269 | 8/1971 | Daniels et al. | 161—170 |
| 3,240,660 | 3/1966 | Atwell | 161—170 |
| 3,243,956 | 4/1966 | Hamm et al. | 161—155 X |
| 3,308,007 | 3/1967 | Shepard | 161—170 |
| 3,388,029 | 6/1968 | Brignac | 161—170 |
| 3,411,980 | 11/1968 | Leshin | 161—227 X |
| 3,572,863 | 3/1971 | Josephson | 161—170 X |
| 3,648,452 | 3/1972 | Young | 161—170 X |

HAROLD ANSHER, Primary Examiner

U.S. Cl. X.R.

161—227, 239, 247, 255, 256